GEORGE CUSTER.

Improvement in Calks for Horseshoes.

No. 4,889. Reissued May 7, 1872.

Witnesses.

G. Anderson
F. B. Curtis

Inventor.

George Custer,
Chipman & Osmun & Co
Attys,

AM. PHOTO-LITHOGRAPHIC CO. N. Y. (OSBORNE'S PROCESS.)

UNITED STATES PATENT OFFICE.

GEORGE CUSTER, OF MONROE, MICHIGAN.

IMPROVEMENT IN TOE-CALKS FOR HORSESHOES.

Specification forming part of Letters Patent No. 101,831, dated April 12, 1870; reissue No. 4,889, dated May 7, 1872.

*To all whom it may concern:*

Be it known that I, GEORGE CUSTER, of Monroe, in the county of Monroe and State of Michigan, have invented a new and valuable Improvement in Toe-Calks for Horseshoes; and I do hereby declare that the following is a full, clear, and exact description of the construction and operation of the same, reference being had to the annexed drawing making a part of this specification, and to the letters and figures of reference marked thereon.

Figure 1:
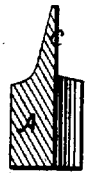
Figure 2:
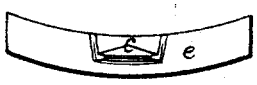
Figure 3:
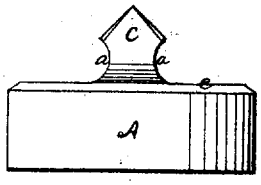

Figure 1 of the drawing is a representation of a vertical section of my invention. Fig. 2 is a top view of the same. Fig. 3 is a front view thereof.

My invention relates to horseshoes; and consists in the construction and novel arrangement of a secure toe-calk, designed to be welded to the front of the shoe, and arranged to take the proper forward set or inclination when thus welded.

The letter A of the drawing designates my toe-calk, a curved bar of cast-steel or other suitable metal. Its upper surface *e* is somewhat beveled forward and downward, and rising from it is a spur or projection, *c*. This spur or projection is flattened from front to rear, and while its rear face is usually made flush with the rear wall of the calk, the front face joins the beveled upper surface within the brink of the front wall, the object of this arrangement being that, when the calk is driven into the shoe, its front shall be flush with the front thereof. At the side of the wedge or spur near its base are formed one or more notches, *a a*, thus giving the spur a neck, as it were. In the welding process the hot iron contracts about this neck, thereby forming a firm and secure fastening. If a single spur does not give the required strength, two or more may be employed.

The object of making the body of the calk with a lateral curve is to give with the same weight of metal a more solid foundation. The beveled upper surface adds to the security of the calk, the strain of the draft in pulling coming partly upon the oblique shoulder.

I am well aware that it is not new to form toe-calks with spurs upon their upper sides; hence I do not claim such, broadly; but

What I claim as my invention, and desire to secure by Letters Patent, is—

The toe-calk, provided with the spur *c*, flattened from before backward, and notched at its base, substantially as specified.

In testimony that I claim the above I have hereunto subscribed my name in the presence of two witnesses.

GEO. CUSTER.

Witnesses:

FRANK RALEIGH,

JOHN P. SCHLUTER.